INVENTOR.
WILLI LEHMANN.
BY
W. D. Palmer
ATTORNEY.

United States Patent Office 3,140,999
Patented July 14, 1964

3,140,999
METHOD OF PREPARING CUBIC ZINC-CADMIUM SULFIDE ELECTROLUMINESCENT PHOSPHOR
Willi Lehmann, Livingston, N.J., assignor to Westinghouse Electric Corporation, East Pittsburgh, Pa., a corporation of Pennsylvania
Filed Jan. 15, 1962, Ser. No. 166,027
5 Claims. (Cl. 252—301.6)

This invention relates to electroluminescence and, more particularly, to electroluminescent phosphor having improved performance characteristics and a method for making such phosphor.

The best-known electroluminescent phosphors have a zinc sulfide matrix. Incorporated into this matrix is a small amount of impurity activator material, such as copper. Usually a small amount of impurity coactivator material, such as chlorine, is required for good electroluminescent characteristics in order to compensate the charges within the phosphor. In explanation, the copper activator has a "one plus" valence and in order to balance the charges within the phosphor, it is necessary to add thereto coactivator such as a halogen or a "three-plus" valent metal.

Most electroluminescent phosphors which have a zinc sulfide matrix and a copper activator display an electroluminescent emission which is confined to two broad bands, one in the blue and the other in the green. It is known that the addition of a manganese activator will promote an emission band in the yellow region of the visible spectrum, but such phosphors are not as bright as desired. Also, zinc-selenide and zinc-cadmium-mercuric sulfide electroluminescent phosphors are known to have an orange to reddish emission, but the selenide-containing phosphors are toxic and the mercury-containing phosphors require elaborate preparation procedures.

It is the general object of this invention to provide electroluminescent phosphor which has a good output in the bluish-green to yellow region of the visible spectrum.

It is another object to provide a method for making electroluminescent phosphor having a strong emission which can be varied from the bluish-green to the yellow region of the visible spectrum.

The aforesaid objects of the invention, and other objects which will become apparent as the description proceeds, are achieved by providing electroluminescent phosphor consisting essentially of copper-activated, bromine or bromine-iodine coactivated, zinc-cadmium sulfide which has a substantially cubic crystalline structure. The molar ratio of zinc sulfide to cadmium sulfide is limited as are the amounts of copper and coactivator which are introduced into the phosphor raw mix. There is also provided a method for making such a phosphor wherein the firing temperature which is used is relatively low and the firing time is prolonged, in order to maintain the cubic crystalline structure.

Figure 1:
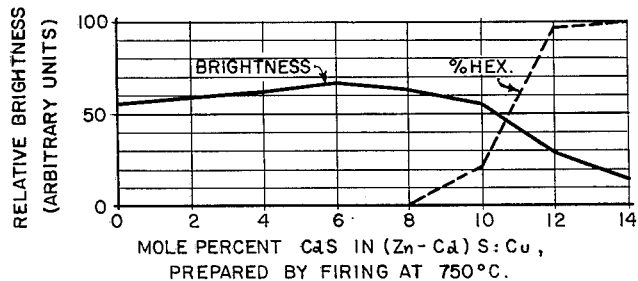
Figure 2:
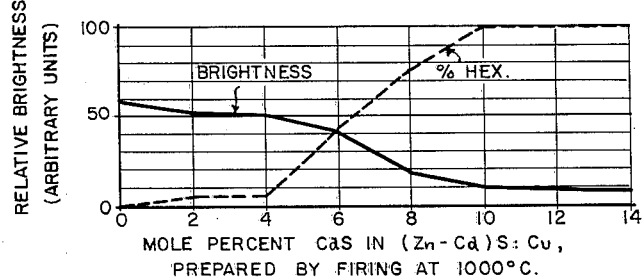
Figure 3:
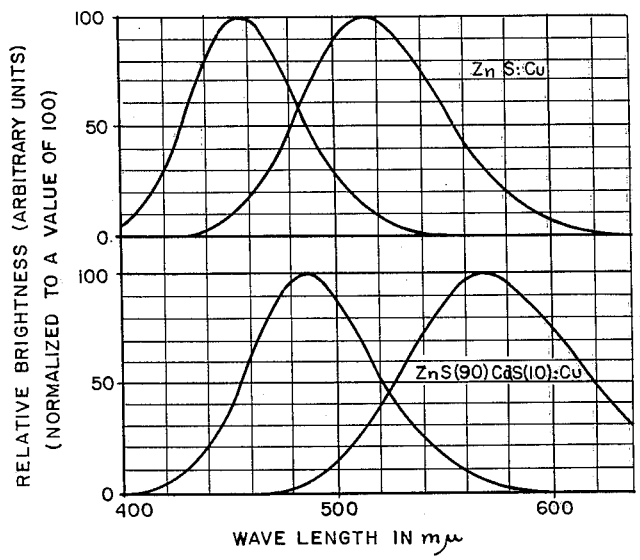

For a better understanding of the invention, reference should be had to the accompanying drawings, wherein:

FIGURE 1 is a graph of brightness versus mole percent CdS for phosphors prepared by firing at a temperature of 750° C., illustrating how the brightness decreases as the crystalline structure shifts from cubic to hexagonal with increasing concentrations of CdS;

FIG. 2 is a graph similar to that shown in FIG. 1, but illustrating the shift in crystal structure from cubic to hexagonal with increasing concentrations of CdS when the phosphor is prepared by firing at a temperature of 1000° C.; and FIG. 3 illustrates a series of graphs of brightness (normalized to a value of 100) versus wavelength, showing the shift in emission which is realized when an appreciable amount of cadmium sulfide is incorporated into the phosphor.

To date, the best copper-activated zinc sulfide electroluminescent phosphors normally have a cubic crystalline structure. Apparently a cubic structure permits cuprous sulfide inclusions to be introduced into the phosphor crystal, which are believed to be necessary to generate the intense electric fields required for good electroluminescence. If the phosphor has a hexagonal crystalline structure, the electroluminescence is normally poor. In the usual case, when relatively large amounts of cadmium sulfide are added to a zinc sulfide-type electroluminescent phosphor, the crystal structure inherently shifts during the phosphor firing to a hexagonal type, as readily determined by X-ray diffraction. For this reason, it has been customary to limit the cadmium sulfide in electroluminescent phosphors to a relatively low amount.

It has been found that by using a bromine or bromine-iodine coactivator with the copper activator and firing at relatively low temperatures for a prolonged period, an appreciable amount of cadmium sulfide can be introduced into the phosphor, while still maintaining a cubic crystalline structure, in order to preserve a good electroluminescent output. The addition of cadmium sulfide into the phosphor shifts the emission peak toward a longer wavelength, as is explained in greater detail hereinafter. In order to obtain an appreciable shift of the emission, at least about eight molar percent of the matrix should be cadmium sulfide. The amount of cadmium sulfide which can be added is limited, however, if a cubic crystalline structure is to be maintained, even with the special firing procedures which will be described hereinafter. To maintain the cubic crystalline structure, the amount of cadmium sulfide in the phosphor matrix should not exceed about fifteen molar percent of the total zinc-cadmium sulfide. The phosphor matrix can thus be defined as cubic zinc-cadmium sulfide wherein the molar ratio of zinc sulfide to cadmium sulfide is from about 92:8 to about 85:15.

With respect to the copper activator, the copper is included in the raw mix for the phosphor, in compound form, in amount of from 0.002 gram atom to 0.03 gram atom of copper per gram mole of the zinc-cadmium sulfide. The bromine or bromine-iodine coactivator is introduced into the raw mix for the phosphor in total amount of from 0.0002 to 0.015 gram atom of bromine or bromine plus iodine per gram mole of the zinc-cadmium sulfide.

In order to maintain a cubic crystalline structure for the phosphor, the firing temperature should be limited to from 600° C. to 750° C. and the phosphor raw mix must be fired for at least about 2 hours, with the greater the cadmium sulfide concentration within the foregoing range, the lower the firing temperature and the longer the firing time. In FIG. 1 is shown the effect on the crystalline structure of increasing the mole percent of cadmium sulfide in zinc-cadmium sulfide electroluminescent phosphor which is prepared by firing at a temperature of 750° C. As shown in the dotted line in this figure, at a cadmium sulfide molar concentration of approximately eight percent, the crystalline structure becomes increasingly hexagonal and, under these firing conditions, when the cadmium sulfide molar concentration is twelve percent, the crystalline structure is 100% hexagonal, with a considerable decrease in the electroluminescent brightness.

As the firing temperature is increased to more than 750° C., the relative percent of hexagonal crystalline structure increases very rapidly, as readily determined by X-ray diffraction, even when fairly small concentrations of cadmium sulfide are introduced into the matrix. As shown in FIG. 2, with a firing temperature of 1000° C., cadmium sulfide concentrations appreciably greater than four molar percent cause the crystalline structure to become hexagonal, see the dotted line in FIG. 2, with a resulting decrease in electroluminescent brightness.

In the following Table I are shown the effects of varying the firing time for a firing temperature of 720° C.

TABLE I

*Variation of Firing Time for ZnS (90%), CdS (10%): Cu (1%), Br Phosphors fired at 720° C.*

| Gram-Atom, Percent Br | Firing Time (hrs.) | Percent hex. | Mean Part. Size ($\mu$) | Electroluminescent Brightness (Arbitrary Units) |
|---|---|---|---|---|
| 0.3 | ½ | 3 | 4 | 7.9 |
| 0.3 | 1 | 5 | 6 | 16.2 |
| 0.3 | 2 | 5 | 8 | 24 |

In order to obtain a good electroluminescent brightness from the present phosphor, the raw mix should be fired within the indicated temperature range for a period of at least about two hours. The firing time preferably is considerably longer and the firing temperature toward the lower end of the foregoing specified range if the cadmium sulfide content is relatively large. For example, with a cadmium sulfide molar concentration of fifteen percent, the raw mix can be fired at 600° C. for 48 hours.

As a specific example for preparing the present phosphor, 87.7 grams of zinc sulfide and 14.5 grams of cadmium sulfide are mixed with 2.0 grams of copper acetate, 0.343 gram of ammonium bromide and 2.0 grams of elemental sulfur. The purpose of the sulfur is to provide a sulfurizing atmosphere in the firing container. These ingredients are intimately mixed by ball milling and are then fired in a nitrogen protective atmosphere at a temperature of 720° C. for four hours in a capped silica tube having such size that the phosphor powder fills about 40% to 50% of the tube volume. After firing and cooling, the phosphor is washed in a solution which is a good solvent for cuprous sulfide, but which is not a good solvent for zinc sulfide or cadmium sulfide. Such a solution is sodium cyanide rendered alkaline by the addition of the small amount of sodium hydroxide, and other solvents which will serve a similar purpose are known, examples being a thiosulfate and thiourea. Under 60 c.p.s. excitation, this phosphor emits primarily in the longer wavelength band shown in the ZnCdS:Cu emission curves of FIG. 3. The color of the phosphor emission is greenish yellow. The brightness of this phosphor is comparable to that of a conventional zinc sulfide, copper-activated and chlorine-coactivated phosphor, excited with the same field intensity.

If it is desired to shift the electroluminescent emission toward the shorter wavelengths, the foregoing specific example can be prepared with only 0.049 gram of ammonium bromide, which is equivalent to 0.05 gram atom percent of bromine. This phosphor has a slightly lighter body color and its electroluminescent emission color, under excitation with a frequency of 60 c.p.s., is bluish green. Its emission is varied slightly from that which is obtainable with copper-activated zinc sulfide phosphor.

The more the cadmium sulfide in the phosphor, the greater the shift toward the longer wavelengths. In FIG. 3 is shown the effect of the shift in the emission bands which is encountered when ten molar percent of zinc sulfide is replaced by an equivalent molar percent of cadmium sulfide.

The maintenance of initial light output for the present bromine-coactivated phosphor is very good if the phosphor after initial firing is cooled in a sulphurizing atmosphere. In copending application Serial No. 58,979, filed September 28, 1960, and owned by the present assignee, there is disclosed a supplementary processing technique wherein the prepared phosphor is baked in an atmosphere comprising oxygen at a temperature of from 470° C. to 750° C. for a period of at least about one hour. When the bromine-coactivated phosphors of the present invention are processed by this baking technique, their half-life, that is the period of time required to decrease the light output to one half its initial value, is considerably in excess of $10^{11}$ cycles. If the phosphor were to be operated at 60 cycles, this would be the equivalent of a half life considerably more than 50 years. Thus the present bromine-coactivated phosphors can be prepared to have an almost phenomenal maintenance.

The present bromine co-activated and copper-activated zinc-cadmium sulfide phosphors are easily prepared to display an emission which is peaked in the bluish-green to greenish-yellow region of the visible spectrum, depending upon the amount of cadmium sulfide and bromine which are included in the phosphor matrix. If it is desired to shift the overall emission of the phosphor more toward the yellow, the cadmium sulfide concentration in the matrix must be relatively high, such as from about eleven to about fifteen molar percent. To maintain the cubic crystalline structure when the phosphor incorporates such relatively high cadmium sulfide concentrations, the firing temperature should be quite low. As an example, up to about fifteen molar percent of cadmium sulfide can be used while still maintaining a cubic crystalline structure, if the phosphor raw mix is fired at a temperature of about 600° C. At such a firing temperature, however, a considerably prolonged firing time is required to react completely the raw-mix constituents when only a bromine coactivator is used, and the particles of the fired phosphor tend to be overly fine. Accordingly, when only a bromine coactivator is used, the molar ratio of zinc sulfide to cadmium sulfide in the matrix is preferably from about 92:8 to about 89:11, since higher cadmium sulfide concentrations require excessive firing times.

The reaction involved during such firing can be speeded up considerably if the bromine coactivator is replaced by an iodine coactivator. An iodine activator, however, enhances the short wavelength emission of the phosphor, thereby defeating the purpose for incorporating the cadmium sulfide into the phosphor matrix.

In order to obtain a yellow emission for the phosphor through the use of relatively large amounts of cadmium sulfide, while still using reasonable firing times, it has been found that a part of the bromine coactivator can be replaced by an iodine coactivator. The bromine coactivator promotes the longer wavelength emission and the iodine coactivator speeds up the reactions involved during firing. In order to achieve this desired result, at least one gram atom of bromine per nine gram atoms of iodine are introduced into the phosphor raw mix, with the total gram atoms of halogen coactivator remaining as specified hereinbefore. The preferred gram atom ratio of bromine to iodine introduced into the phosphor raw mix is about 1:1.

Thus with the use of both a bromine and an iodine coactivator in the present phosphor, cadmium sulfide concentrations up to about fifteen molar percent can be used and the phosphor fired at relatively low temperatures for reasonable times to maintain the cubic crystalline structure. As a specific example, 83 grams of zinc sulfide and 21.7 grams of cadmium sulfide (representing 85 mole percent ZnS and 15 mole percent CdS) are mixed with 2 grams of copper acetate, 0.22 gram of ammonium bromide, 0.33 gram of ammonium iodide, and 2 grams of purified sulfur, which provides a sulfurizing atmosphere. This represent an addition of one gram-atom percent copper, about 0.23 gram-atom percent bromine, and about 0.23 gram-atom percent iodine, calculated with respect to the total moles of zinc-cadmium sulfide. As a specific example, these constituents are intimately mixed by ball milling and are fired at approximately 600° C. for about four hours under the conditions as specified hereinbefore. After firing and cooling, the phosphor is conventionally washed in a cyanide solution, such as specified hereinbefore.

The particle size of the cubic crystalline phosphors of the present invention can be increased by firing the processed phosphor in an atmosphere consisting essentially of iodine vapor at temperatures and for time periods as used in initially preparing the phosphor. Thereafter the phosphor is heated in an open boat in an iodine-vapor-free atmosphere for temperatures and times as used in initially preparing the phosphor.

The preferred method for preparing the present phosphors is to include the coactivator in compound form in the phosphor raw mix in amount of from 0.0002 to 0.015 gram-atom of total coactivator per gram mole of zinc and cadmium sulfides. It should be understood, however, that the halogen can be introduced into the raw mix of the phosphor through the firing atmosphere. The effect will be the same in either case since zinc iodide and zinc bromide have appreciable vapor pressures at the specified firing temperatures and establish an equilibrium condition.

When forming the raw mix, a sulfurizing atmosphere can be provided by the addition of $H_2S$ to the firing atmosphere, rather than by adding elemental sulfur to the raw mix. The phosphor can also be fired in oxygen-free protective atmospheres other than nitrogen, an example being argon.

It will be recognized that the objects of the invention have been achieved by providing an electro-luminescent phosphor which has an emission varying from the bluish-green to the yellow region of the visible spectrum. There has also been provided a method for making electroluminescent phosphor having an emission which can be varied from the bluish-green to the yellow region of the visible spectrum.

While best examples have been illustrated and described hereinbefore, it is to be particularly understood that the invention is not limited thereto or thereby.

I claim as my invention:

1. The method of making a copper-activated zinc-cadmium sulfide electroluminescent phosphor having a substantially cubic crystalline structure, which method comprises: mixing the following raw-mix constituents in the following stated proportions: zinc and cadmium sulfides in the molar ratio of from about 92:8 to about 85:15, and from 0.002 to 0.03 gram atom of copper in compound form per gram mole of total sulfide; introducing into the raw mix for said phosphor, in amount of from 0.0002 to 0.015 gram atom per gram mole of total sulfide, halogen of the group consisting of bromine and bromine plus iodine, with the gram atom ratio of bromine/iodine in said group at least 1/9; firing the raw mix constituents in an oxygen-free sulfurizing atmosphere at a temperature of from 600° C. to 750° C. for at least about two hours, with the greater the cadmium sulfide concentration within the foregoing molar ratio, the lower the firing temperature and the longer the firing time.

2. The method as specified in claim 1, wherein said phosphor after preparation by firing is washed in a solution which is a good solvent for cuprous sulfide but which is not a good solvent for zinc and cadmium sulfides.

3. The method of making a copper-activated zinc-cadmium sulfide electroluminescent phosphor having a substantially cubic crystalline structure, which method comprises: mixing the following raw-mix constituents in the following stated proportions: zinc and cadmium sulfides in the molar ratio of from about 92:8 to about 85:15, from 0.002 to 0.03 gram atom of copper in compound form per gram mole of total sulfide, and from 0.0002 to 0.015 gram atom per gram mole of total sulfide of halogen in compound form of the group consisting of bromine and bromine plus iodine, with the gram atom ratio to bromine/iodine in said group at least 1/9; and firing the foregoing constituents in an oxygen-free sulfurizing atmosphere at a temperature of from 600° C. to 750° C. for at least about two hours, with the greater the cadmium sulfide concentration within the foregoing molar ratio, the lower the firing temperature and the longer the firing time.

4. The method of making copper-activated zinc-cadmium sulfide electroluminescent phosphor having a substantially cubic crystalline structure, which method comprises: mixing the following raw-mix constituents in the following stated proportions: zinc and cadmium sulfides in the molar ratio of from about 92:8 to about 89:11, from 0.002 to 0.03 gram atom of copper in compound form per gram mole of total sulfide, and from 0.0002 to 0.015 gram atom of bromine in compound form per gram mole of total sulfide; firing the foregoing constituents in an oxygen-free sulfurizing atmosphere at a temperature of from 600° C. to 750° C. for at least about two hours, with the greater the cadmium sulfide concentration within the foregoing molar ratio, the lower the firing temperature and the longer the firing time; and thereafter washing said phosphor in a solution which is a good solvent for cuprous sulfide but which is not a good solvent for zinc and cadmium sulfides.

5. The method of making copper-activated zinc-cadmium sulfide electroluminescent phosphor having a substantially cubic crystalline structure, which method comprises: mixing the following raw-mix constituents in the following stated proportions: zinc and cadmium sulfides in the molar ratio of from about 92:8 to about 85:15, from 0.002 to 0.03 gram atom of copper in compound form per gram mole of total sulfide, and from 0.0002 to 0.015 gram atom of total bromine and iodine in compound form per gram mole of total sulfide, with the gram atom ratio of bromine to iodine approximately 1/1; and firing the foregoing constituents in an oxygen-free sulfurizing atmosphere at a temperature of from 600° C. to 750° C. for at least about two hours, with the greater the cadmium sulfide concentration within the foregoing molar ratio, the lower the firing temperature and the longer the firing time; and thereafter washing said phosphor in a solution which is a good solvent for copper sulfide but which is not a good solvent for zinc-cadmium sulfide.

References Cited in the file of this patent

UNITED STATES PATENTS

| 2,957,830 | Goldberg et al. | Oct. 25, 1960 |
| 2,968,627 | Wachtel | Jan. 17, 1961 |
| 2,982,740 | Goldberg et al. | May 2, 1961 |